Jan. 3, 1956 G. L. FREDENDALL 2,729,698

ELECTRICAL FILTERS

Filed Sept. 22, 1954 2 Sheets-Sheet 1

INVENTOR.
GORDON L. FREDENDALL
BY
ATTORNEY

INVENTOR.
GORDON L. FREDENDALL
BY
ATTORNEY 2,729,698

ELECTRICAL FILTERS

Gordon L. Fredendall, Huntingdon Valley, Pa., assignor to Radio Corporation of America, a corporation of Delaware Application September 22, 1954, Serial No. 457,687
9 Claims. (Cl. 178—5.4)

This invention relates generally to electrical filtering apparatus, and more particularly to novel and improved filters of a modified multiple bandpass or "comb" type, and to systems for utilizing such filters in apparatus such as color television receivers.

There has been disclosed in the prior art filters of a multiple bandpass type, or what shall be particularly referred to herein as a "comb" type, i. e. a filter which possesses a series of alternate pass and stop bands, the centers of which are situated at regular intervals in the frequency spectrum. As an example, a coaxial line filter having such a response is discussed in chapter 4 of the book entitled "Wave Filters," by L. C. Jackson, published by Methune and Co. Ltd. in 1944. Such a filter is also disclosed in U. S. Patent No. 1,781,469, W. P. Mason, issued on November 11, 1930.

Among other possible uses, a comb filter is of interest in a color television system of the simultaneous subcarrier type, such as one which accords with the color television broadcast standards adopted by the FCC. An explanation of a color television system of this type and its principles and development is contained in the article entitled "Principles and development of color television systems," by G. H. Brown and D. G. C. Luck, appearing in the June 1953 issue of the RCA Review. Briefly, in such a color television system, color information is added to luminance information through the medium of a modulated color subcarrier which accompanies a broad band luminance signal.

In an article entitled "Optimum utilization of the radio frequency channel for color television," by R. D. Kell and A. C. Schroeder, which appears in the same issue of the RCA Review, the factors which enter into the choice of an optimum frequency for the subcarrier wave in such a color television system are discussed. It is desirable to choose a subcarrier frequency which is an odd multiple of half the frame frequency, and particularly one which is also an odd multiple of half the line frequency, so as to interlace the subcarrier and its sidebands in the frequency spectrum with the harmonics of line and frame frequency and so as to interlace any "dot" reproductions of the subcarrier in the reproduced picture, the common purpose from either point of view being to reduce interference between the brightness video signal and the color subcarrier. The choice of a subcarrier frequency with such a relation to frame and line frequencies thus provides so-called dot interlace or frequency interlace.

The exact placement of a subcarrier frequency of such relationship in the video frequency spectrum is however subject to conflicting desires for choosing a relatively high frequency and a relatively low frequency. To minimize visibility of the subcarrier in a reproduction, it is desirable to make the residual dot structure as fine as possible by selecting a high subcarrier frequency. However the 6 mc. channel width limitation necessarily imposed by FCC channel allocation requirements, and the practical limitation of bandwidth available for video signals within the 6 mc. band dictated by the necessity of minimizing the appearance of accompanying sound in a receiver's video channels, effectively place a ceiling of approximately 4 mc. on the subcarrier frequency choice.

The reason for desiring a lower subcarrier frequency is based upon the desire for double band transmission of the subcarrier whereby the maximum amount of color information may be conveyed by the modulated subcarrier with a minimum of crosstalk. While a complete analysis of the requisite information content for the subcarrier signal, the causes of crosstalk, etc. is not essential for an understanding of the present invention and may be obtained from the aforementioned articles, it may be noted that two independent pieces of information must be conveyed by the subcarrier in addition to the luminance information contained in the accompanying broad band signal to permit three-color image reproductions. The requisite two pieces of information may be conveyed by the single subcarrier by means of use of both phase and amplitude modification. However, if single sideband transmission of the phase and amplitude modulated subcarrier is utilized, crosstalk between the two information bearing signals occurs due to the missing sideband. Therefore, to transmit the maximum color information with a minimum of crosstalk it would be desirable to place the subcarrier frequency as low as the frequency corresponding to the mid-point of the effective video band.

In the aforementioned FCC signal standards, a compromise has been reached between the desire for reduced dot structure visibility and the desire to transmit a maximum amount of color information without crosstalk by placing the subcarrier frequency at a value of 3.579545 mc. This permits double sideband transmission and utilization of the color subcarrier for signal frequencies up to approximately .6 mc., with only single sideband transmission practically permissible for signal frequencies above .6 mc. In a proposed color television system of the type discussed in the aforementioned Brown-Luck article which is in accordance with the aforementioned signal standards, for color signals up to approximately the .6 mc. limit, the color subcarrier is both phase and amplitude modulated to permit effective three-color reproduction of relatively large picture areas, while for color signals above this limit the color subcarrier is constant in phase but modulated in amplitude to permit effective two-color reproduction for intermediate area detail. No color information is added to the luminance information contained in the broad band signal for the finest picture detail.

As a result of the location of the color subcarrier frequency at approximately 3.58 mc., which frequency is well within the 4 mc. video band available for utilization by a receiver, a problem is presented if full utilization of this band is desired on the one hand and reduction of visibility of the subcarrier to a safe level is desired on the other hand. In the present practice of the color television receiver art, the color subcarrier and sidebands of a significant magnitude are attenuated in the brightness channel (also referred to as the monochrome or luminance channel) by trap circuits so that appearance of a dot structure in the color reproduction due to partial rectification of the subcarrier components by the reproducing kinescope (and moire between this signal dot structure and the physical dot structure of the phosphor screen in the usual tri-color kinescope) are minimized. The successful of such trap circuits for this purpose, however, results in substantial attenuation of the high frequency luminance signals and therefore results in a reduction in the resolution of the color reproduction.

It will therefore be appreciated that if the brightness channel were supplied with means for substantially removing the color subcarrier and its significant sidebands therefrom, while having little or no effect on the high frequency components of the luminance signal, the problem would be more satisfactorily solved. Subcarrier visibility could be reduced to an insignificant level without seriously affecting resolution. It is in this connection that a filter of the so-called "comb" type appears of particular interest.

As was previously indicated the choice of color subcarrier frequency as an odd multiple of one half the frame frequency, and particularly as one which is also an odd multiple of half the line frequency, is made with one object of interlacing the color subcarrier and its sidebands with the harmonics of frame and line frequency. The desirability of providing such frequency interlace resides in the fact that the frequency components of an ordinary television signal are generally "clustered" in the frequency spectrum about harmonics of the line frequency. The color subcarrier and its sidebands thereby fall in relatively unused gaps in the video frequency spectrum. It would therefore appear that significant advantage could be taken of a comb filter whose passbands were centered about the harmonics of line frequency, since such a filter should selectively pass the components of the luminance signal while rejecting the color subcarrier and its sidebands.

However, a limitation on the full value of the frequency interlace principle is that the presence of motion and sharp detail in television pictures complicates the situation by introducing video components which are not closely grouped about line frequency and its harmonics but lie between successive harmonics. The preservation of such transient components lying in the lower frequency range of the brightness signal is important. On the other hand, components lying in the upper range may safely be attenuated without significant deterioration of the picture. Therefore use of an unmodified comb filter for the purposes of completely removing the subcarrier components from the brightness channel would appear to be undesirable from the transient point of view, since proper reproduction of motion of a televised subject (and proper reproduction of detail in the vertical scanning direction as well) might seriously suffer should desired luminance signal components derived from the image fall outside the passbands of the comb filter.

This drawback to such uses of an unmodified comb filter was recognized in my co-pending application. Ser. No. 393,402, filed November 20, 1953, and entitled "Electrical Filter," wherein there was disclosed a comb filter modified so as to fill in the gaps between the passband "teeth" over a desired portion of the filter's response characteristic. Thus for the indicated color television reeciver use, a modified comb filter could be inserted in the receiver's luminance channel, the filter having a flat response characteristic for signal frequencies up to some value such as 3.2 mc., and provided with multiple stopbands thereabove centered about odd harmonics of half the line frequency. A proper rendition of image motion is thus assured, while reducing subcarrier visibility to a safe level.

Comb filters disclosed in my aforesaid co-pending application involve use of a transmission line, open at the receiving end and terminated at the sending end in the line's characteristic impedance. Achievement of the comb characteristic, and modification thereof as noted above, involved the combination of signals derived from both the terminated sending end and the open receiving end.

The present invention is concerned with the achievement of a comb filter characteristic, and modification thereof as in the aforementioned application, using however so-called ultrasonic delay lines, such as quartz or mercury lines, which appear to be promising media for achieving the desired modified comb filter characteristic in practice. However, the nature of such delay lines presents certain practical difficulties in attempts to utilize them in manners directly analogous to the use of transmission lines noted above. Ultrasonic delay lines such as the aforementioned quartz and mercury lines are normally terminated at both ends, without the possibility of taking off an output voltage from a given end and at the same time retaining it as an open end, i. e. any practical voltage takeoff from an end of such a line necessarily terminates that end. In addition, such ultrasonic delay lines, unlike ordinary transmission lines, act as high pass filters, i. e. the passband of such lines is inherently incapable of extending to the lower end of a video signal frequency range. The low frequency cutoff of such a line may be of the order of megacycles.

Accordingly, these inherent attributes of ultrasonic delay lines are taken into account in the present invention in providing a modified comb filter utilizing such lines. In accordance with an embodiment of the present invention, provision is made for the modulation of a sine wave carrier with the signals to be subjected to the modified comb filter characteristic so as to utilize the passband of the ultrasonic delay line. Subsequent demodulation of the modulated carrier returns the passed signal frequencies to their normal band. Also, the delay line apparatus for effecting the comb filter characteristic requires no voltage take-offs from open ends of the ultrasonic delay lines.

Thus, a primary object of the present invention is to provide novel and improved electrical filtering apparatus.

A further object of the present invention is to provide a novel and improved filter of a multiple bandpass or comb type, utilizing an ultrasonic delay line.

An additional object of the present invention is to provide a novel and improved filter of a modified multiple bandpass or comb type.

Another object of the present invention is to provide a novel comb filter of a modified type in which the gaps between the passband teeth of the filter response characteristic are effectively filled in to provide a relatively wide passband over a desired portion of the characteristic.

A further object of the present invention is to provide novel and improved filtering apparatus for use in the separation of luminance and chrominance information in a simultaneous subcarrier type color television system.

An additional object of the present invention is to provide a color television receiver with novel and improved apparatus for removing color subcarrier components from the brightness signal channel with a minimum effect on picture resolution and proper reproduction of motion.

Other objects and advantages of the present invention will be readily appreciated by those skilled in the art after a reading of the following detailed description and an inspection of the accompanying drawings in which.

Figure 1:
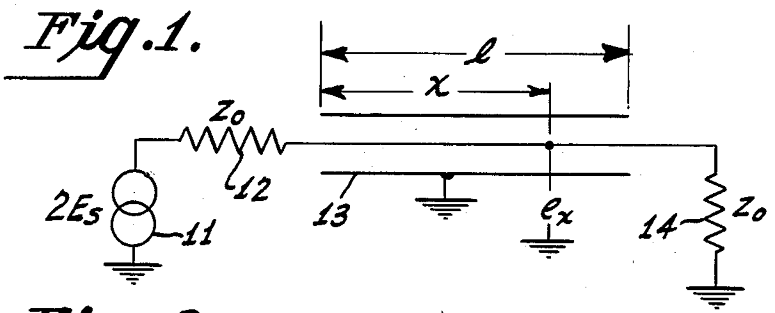
Figures 1 and 2 illustrate schematically delay line arrangements which aid in an explanation of principles of the present invention.

For an understanding of the general principles underlying the present invention, reference is first made to the schematic illustration of Figure 1. An ultrasonic delay line, such as a quartz or a mercury line, for example, is indicated schematically by the line designated 13 in the drawing. A signal source 11 is coupled to one end of the delay line 13 via a terminating resistor 12, of an impedance corresponding to the characteristic impedance $Z_0$ of the delay line. The opposite end of the delay line 13, which has a length *"l,"* is also terminated by a resistor 14 of the aforesaid characteristic impedance magnitude.

At signal frequencies within the passband of the delay line 13 and significantly above the cutoff frequency thereof, the voltage at any point "x" along the line is given by the formula:

$$e_x=\sqrt{2E_s}\cos(2\pi ft-\beta x)$$

where $E_s$ is half the R. M. S. source voltage; $\beta$ is the phase constant, equal to $2\pi f\sqrt{LC}$, where L and C are the line constants expressed in henries and farads per centimeter, respectively; "$f$" is the signal frequency in cycles per second; and "$x$" is the distance in centimeters along the delay line 12 from the input end thereof to the point in question. The line is assumed to be lossless. At $x=0$, $e_x=\sqrt{2E_s}\cos 2\pi ft$; at $x=l$, i. e. at the output end of the delay line $e_x=\sqrt{2E_s}\cos(2\pi ft-\beta l)$.

Figure 2:
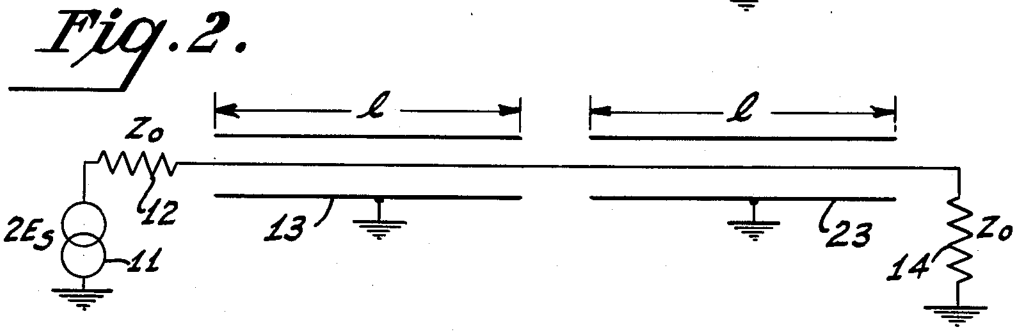

In Figure 2 a second delay line 23, similar to the delay line 13 in all respects, is placed in cascade with the first delay line, and terminated by resistor 14 of the aforesaid characteristic impedance magnitude. It will be appreciated that the output voltage at the end of the second delay line 23, in accordance with the relationships set forth above, equals $\sqrt{2E_s}\cos(2\pi ft-2\beta l)$. If the sum of the input voltage of the first delay line 13 (i. e. $e_x$, where $x=0$), twice the input voltage of the first delay line 13 (i. e. $2e_x$, where $x=l$), and the output voltage of the second delay line 23 (i. e. $e_x$, where $x=2l$), is formed, the resultant output voltage $e_0$ obeys a characteristic, $e_0=2\sqrt{2E_s}A\cos(2\pi ft-\beta l)$, where $A=(1+\cos\beta l)$. As the above expression indicates, the output voltage of the described delay line voltage combining operation will reflect the sinusoidal variation of response with frequency desired for a comb filter. To obtain a given period $f_0$ for this sinusoidal variation of response with frequency, the length "$l$" of each of the delay lines 13 and 23 is chosen to be equal to $$\frac{1}{f_0\sqrt{LC}}$$

$\sqrt{LC}$ representing the delay imparted per centimeter of delay line, L and C being the aforementioned line constants expressed in henries and farads per centimeter respectively.

Figure 3:
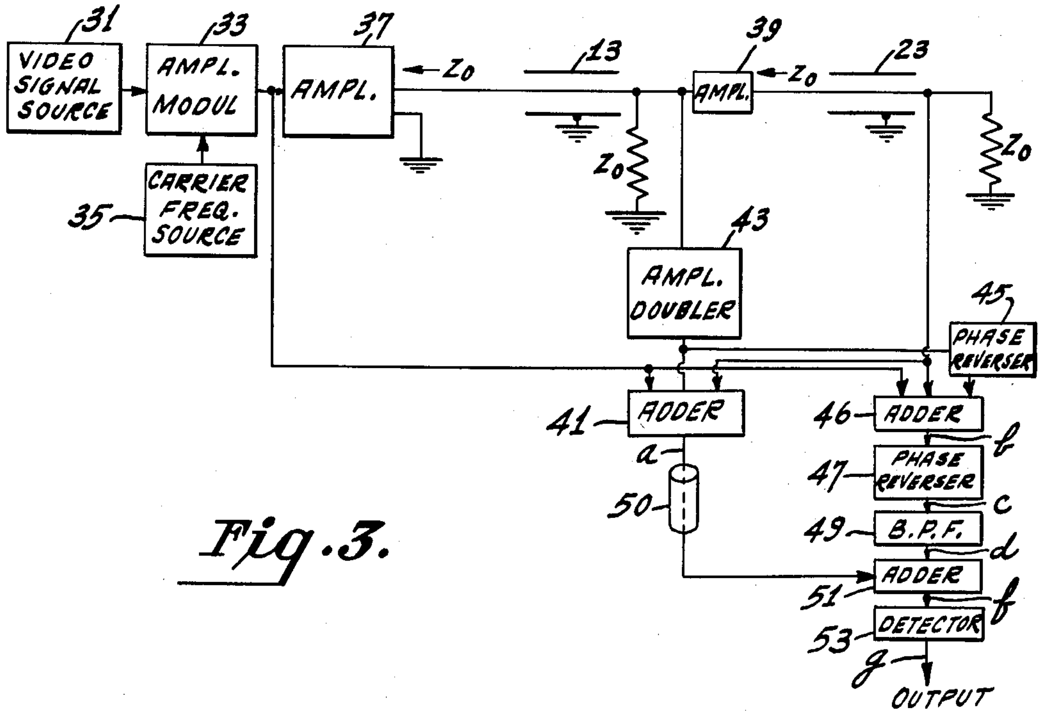
Figure 3 illustrates in block and schematic form apparatus for providing a modified comb filter in accordance with an embodiment of the present invention.

As indicated previously, ultasonic delay lines, such as quartz or mercury lines, are inherently high pass filters, possessing a cutoff frequency, below which frequency the line provides very high signal attenuation. Figure 3 illustrates modified comb filter apparatus, in which the delay line voltage combining operation described above is carried out, and in which provision is made for the shifting of signal frequencies to fall within the passband of the delay lines utilized.

Referring more specifically to Figure 3, a video signal source 31 is illustrated in block form. The source 31 may, for example, comprise the video or second detector of a color television receiver. The video signal output of source 31 is applied to an amplitude modulator 33 wherein a sine wave carrier supplied by a carrier source 35 is modulated in amplitude in accordance with the video signals from source 31. The modulated carrier output of modulator 33 is applied via an amplifier 37 to the input end of a delay line network of the character illustrated in Figure 2. In the indicated television application, the length of each of the delay lines is chosen to be equal to $$\frac{1}{f_h\sqrt{LC}}$$

where $f_h$ is the line scanning frequency of the television system producing the input video signals, and L and C are the aforementioned line constants. An amplifier 39 is illustrated as being included in the connection between the output of the first delay line 13 and the input of the second delay line 23. The amplifiers 37 and 39 are shown in conjunction with the respective delay lines 13 and 23 for practical considerations, i. e. to overcome the rather high attenuation usually effected in ultrasonic delay lines. It will be appreciated that the presence of these amplifiers will not significantly alter the voltage relationships set forth previously, but for accuracy the delay of the amplifiers may be considered in the design calculation as part of the delay of the line.

An adder 41 is illustrated for effecting the combination of the input voltage to delay line 13, the output voltage of delay line 13, and the output voltage of delay line 23. In accordance with the relationship of input voltages to adder 41 required to achieve the desired comb characteristic, the application of the output voltage of delay line 13 to adder 41 is achieved via amplitude doubling apparatus 43, which may take the form of conventional amplifying apparatus. For theoretical accuracy, delay means (not illustrated) may be included in the respective couplings of the other two input voltages to adder 41 so as to balance the delay introduced by the gain of the amplifier 43. As indicated by the relationship previously derived, the output voltage of adder 41 obeys a response characteristic of the sinusoidally varying type, illustrated by curve $a$ of Figure 4.

Apparatus including polarity reverser 45, adder 46, and polarity reverser 47 is also illustrated as utilizing the voltages derived from the delay lines to achieve a second comb characteristic which is effectively complementary to the comb characteristic $a$. The manner in which this complementary comb filter characteristic is achieved may be summed up briefly as follows. By reversing the polarity of the output of amplifier 43 in reverser 45, and combining the output thereof with the input voltage to delay line 13, and the output voltage of delay line 23 in adder 46, an output voltage is obtained which has a sinusoidally varying response characteristic of the character illustrated by curve $b$ of Figure 4. By applying this output voltage to polarity reverser 47, a further output voltage is obtained which has a sinusoidally varying response characteristic of the character illustrated by curve $c$ of Figure 4.

Comparison of the curves $a$ and $c$ will reveal that these are mutually complementary comb filter characteristics, i. e. the regularly spaced passbands of characteristic $a$ coincide in the frequency spectrum with the regularly spaced stop-bands of characteristic $c$, and conversely the regularly spaced passbands of characteristic $c$ coincide in the frequency spectrum with the regularly spaced stop-bands of characteristic $a$.

The output of polarity reverse 47 is applied to a bandpass filter 49, filter 49 having a passband encompassing the upper and lower sideband frequencies of the modulated carrier that represent the video signal frequencies for which a "comb effect" is not desired; i. e. in the embodiment of Figure 3, the passband of filter 49 is centered about the frequency of the carrier output of source 35, and has twice the width of that portion of the video signal frequency spectrum over which the "comb effect" is not desired. For example, if the comb effect is not desired for a range of video frequencies from 0–3.2 mc., the passband of filter 49 may be chosen to extend over a width of 6.4 mc. The output voltage derived from bandpass filter 49 obeys a response characteristic of the character illustrated by curve $d$ of Figure 4.

The output of filter 49 is combined with the output of adder 41 in another adder 51. The coupling between adder 41 and adder 51 may include a delay line 50, imparting sufficient delay to the output of adder 41 to balance the delay introduced by filter 49. The result of the combination of the two input voltages in adder 51 is indicated by the response characteristic illustrated by curve $f$ of Figure 4. It will be seen that over a region of the frequency spectrum corresponding to the passband of filter 49, the "teeth" of the respective complementary comb filter characteristics mesh to provide a relatively wide passband region free of "comb" filtering.

The output of adder 51 is applied to a conventional amplitude detector 53, which effects a demodulation of the video modulated carrier to recover the video signals. The output of detector 53 obeys a response characteristic of the character illustrated by curve *g* of Figure 4. This is the desired modified comb filter characteristic, comprising a relatively wide passband at the low end of the video frequency spectrum and a comb filter characteristic thereabove. As determined by the indicated choice of the length of each of the delay linees 13 and 23 to be equal to $$\frac{1}{f_h\sqrt{LC}}$$

the stop bands of the comb filter portion of the characteristic are centered about odd harmonics of half the line frequency, $f_h$. The modified comb filter apparatus of Figure 3 may thus serve to advantage in removing the color subcarrier (and significant sidebands thereof) of a standard color television signal from the luminance channel of a color receiver, without unduly limiting the resolution of the color image reproduction. By virtue of the "filling in" of the comb "teeth" over a predetermined portion of the low end of the video signal frequency spectrum, such as 0–3.2 mc., for example, this rejection of color subcarrier components is carried out with minimum interference with the proper reproduction of motion and "vertical" detail in the televised scene.

It should be noted at this point that while the preceding description has been aided and simplified by considering the delay line apparatus as comprising two similar delay lines (13 and 23) in cascade, the combination thereof may also be considered as a single delay line, having a voltage take-off at its center point. Thus it should be appreciated that in practice of the invention, one may utilize a single "center-tapped" delay line as a particular apparatus alternative to the use of two similar delay lines in cascade.

Figures 4, 5:
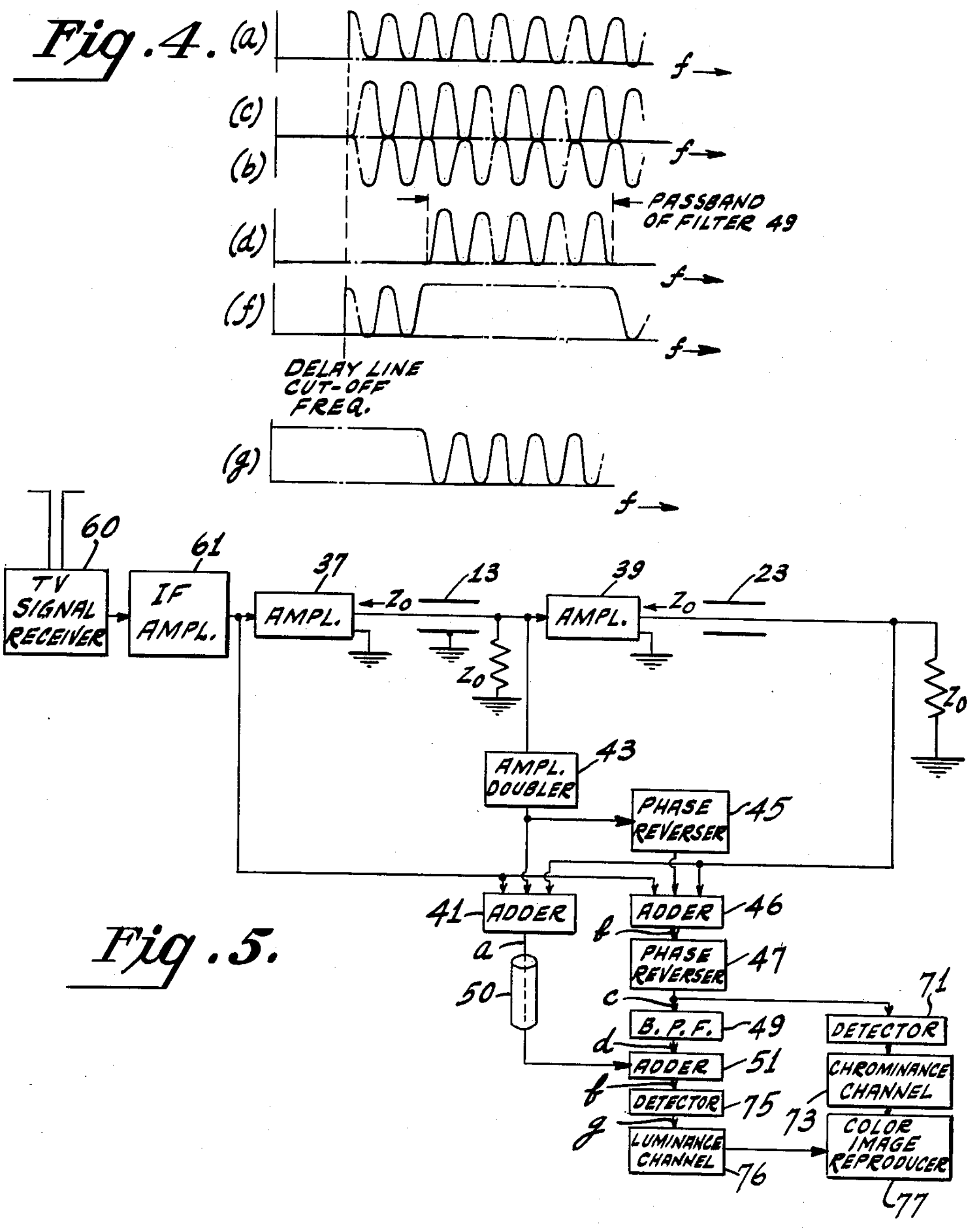
Figure 4 illustrates graphically frequency response characteristics for various portions of the apparatus illustrated in Figure 3.
Figure 5 illustrates in block and schematic form a color television receiver utilization of a modified comb filter in accordance with another embodiment of the invention.

Figure 5 illustrated an arrangement for utilizing a modified comb filter, embodying the principles of the present invention discussed above, in the I. F. channel of a color television receiver. It will be appreciated that in the arrangement illustrated in Figure 5, it is not necessary to provide a carrier source 35 and an amplitude modulator 33 for the purpose of shifting the video signals to a portion of the frequency spectrum falling within the natural passband of the ultrasonic delay line, as in Figure 3, since at intermediate frequencies, the composite color television signal does fall within the delay line passband. Thus, the signal source coupled to the input end of delay line 13 may comprise the I. F. amplifier 61 of a color television receiver. The I. F. amplifier 61 may be preceded by the usual television receiver head-end apparatus 60, comprising conventional R. F. amplifying and frequency converting apparatus, for example.

As in the embodiment of Figure 3, combination of the input voltage to delay line 13, the doubled output voltage of delay line 13, and the output voltage of delay line 23 in adder 41 again provides a predetermined comb filter characteristic *a*. In particular, the delay line lengths and constants will be chosen to provide a comb filter characteristic for the output of adder 41 in which the regularly spaced stop-bands are centered about odd multiples of half the line frequency of the color television signal. Thus, the chrominance signal, i. e. the color subcarrier and its sidebands, will not appear in the output of adder 41.

Use of the polarity reverser 45, the adder 46, and the polarity reverser 47, in the manner employed in the embodiment of Figure 3, will again provide a comb filter characteristic *b* for the output of reverser 47 which is complementary to the comb filter characteristic *a* of the output of adder 41. That is, the comb filter characteristic of the output of reverser 47 will have regularly spaced passbands centered about odd multiples of half the line frequency of the color television system. Thus, the output of reverser 47 will comprise the chrominance signal, and will be free of luminance signal components, other than those falling outside the normal frequency spectrum clusters due to motion in the televised scene. The output of reverser 47 therefore provides a desirable point for the take-off of chrominance information. Hence, in the illustrated arrangement, a separate chrominance channel detector 71 is coupled to the output of reverser 47, the output of detector 71 essentially comprising the color subcarrier and its sidebands. The chrominance signal output of detector 71 may be applied to a conventional chrominance signal channel 73, including means for effecting the synchronous detection of the modulated color subcarrier to obtain respective color-difference signal information therefrom.

The output of reverser 47 is also applied through bandpass filter 49 to the adder 51 for combination with the output of adder 41 to obtain the "meshing" of complementary comb filter characteristics, as in the embodiment of Figure 3. With application of the output of adder 51 to a luminance channel detector 75, an output is obtained which obeys the modified comb filter characteristic desired for the luminance channel 76 to which the output of detector 75 is applied, the modified comb characteristic being illustrated by curve *g* of Figure 4. The net effect is to provide the luminance channel with a flat frequency response characteristic for the low end of the video signal band, and with a multiple bandpass characteristic thereabove, with the regularly spaced stop-bands positioned in the video frequency spectrum such as to reject the color subcarrier and a substantial number of its sidebands from the luminance channel. The outputs of the luminance channel 76 and the chrominance channel 73 are applied to color image-reproducing apparatus 77 for suitable combination to effect a desired reproduction in color of the televised scene.

The embodiment of the invention illustrated in Figure 5 represents an application of the principles of the embodiment of Figure 3 to a section of a color television receiver where advantage may be taken of the location of the picture information in a region of the frequency spectrum lying within the passband of the delay lines employed. The arrangement of Figure 5 also demonstrates that advantage may be taken of the presence of the complementary curve filter characteristic in the modified comb filter apparatus to provide desirable selectivity for the chrominance channel of the receiver as well. It will be appreciated that in both of the discussed embodiments of the invention, the indicated modification of the luminance channel comb filter characteristic insures that while satisfactory rejection of the color subcarrier and its sidebands from the luminance channel is achieved, there is a minimum degree of interference with the proper reproduction of motion and "vertical" detail in the televised scene due to the "filling in" of the comb filter characteristic throughout a significant portion of the luminance signal spectrum.

It may be noted that in the I. F. channel embodiment of the invention illustrated in Figure 5, the vestigial sideband character of the carrier modulation may be taken into account in choosing the passband of the filter 49. That is, since the upper sideband of the modulated I. F. carrier is substantially restricted in extent in comparison with the extent of the lower sideband, the passband of filter 49 may be similarly restricted above the frequency of the modulated I. F. carrier.

The embodiments of the present invention described above involve the use of so-called ultrasonic delay lines, such as liquid mercury lines or solid quartz lines. For details concerning typical forms for such delay lines, signal take-offs therefor, typical design calculations, etc., reference may be made to publications, such as the "Components Handbook," of the M. I. T. Radiation Laboratory Series, edited by J. F. Blackburn, and published by McGraw-Hill Book Co. in 1949, and particularly to pages 219 through 242 thereof. For more explicit information concerning the details of color television receiver apparatus in which embodiments of the present invention may advantageously be employed, reference may be made to such publications as the June 1953 issue of the RCA Review, and to the aforementioned Brown-Luck article therein.

Having thus described the invention, what is claimed is:

1. An electrical filter comprising the combination of delay line means having an input end, an output end and a central tapping point, means for applying signals to said delay line means input end, means for combining signals from said delay line means input end, output end and central tapping point to obtain an output signal which obeys a multiple bandpass characteristic, means for reversing in phase signals derived from said delay line means central tapping point, means for combining said phased reversed signals with signals from said delay line means input end and output end to obtain a second output signal obeying a second multiple bandpass characteristic substantially complementary to said first-named multiple bandpass characteristics, a bandpass filter, means for applying said second output signal to said bandpass filter, and means for combining said first-named output signal with the output of said bandpass filter.

2. Apparatus in accordance with claim 1 wherein the signals applied to said delay line means input end comprise a video modulated carrier, wherein the passband of said bandpass filter encompasses the frequency of said carrier, and including an amplitude detector, the output of said last-named combining means being applied to said amplitude detector.

3. Apparatus in accordance with claim 1 wherein said means for applying signals to said delay line means input end comprise a source of video signals, a carrier frequency source, means for modulating the amplitude of the output of said carrier frequency source in accordance with said video signal, and means for coupling said carrier modulating means to the input end of said delay line means.

4. Apparatus in accordance with claim 3 wherein said delay line means has a predetermined passband, the frequency of said carrier falling within said passband, said apparatus also including an amplitude detector coupled to said last-named signal combining means.

5. In a color television receiver adapted to receive a composite color picture signal including a luminance signal component and a chrominance signal component, said chrominance signal component comprising a phase and amplitude modulated color subcarrier, said receiver including an RF converter, a luminance signal channel, and a chrominance signal channel, apparatus in accordance with claim 1 wherein said means for applying signals to said delay line means input end comprises said RF converter, said apparatus also including an amplitude detector coupled to said last-named signal combining means, means for coupling said luminance signal channel to said detector, an additional amplitude detector coupled to said phase reversing means, and means for coupling said chrominance signal channel to said additional amplitude detector.

6. In a color television receiver, filtering apparatus comprising a first comb filter network having a predetermined low frequency cutoff and providing for signals applied thereto a first multiple bandpass characteristic above said predetermined cutoff frequency, a second comb filter network having a corresponding low frequency cut-off and providing for signals applied thereto a different multiple bandpass characteristic above said predetermined cutoff frequency which is substantially complementary to said first multiple bandpass characteristic, a source of signals, said signals comprising video modulated carrier waves, the frequency of said carrier being above said predetermined cutoff frequency, means for applying the signals from said source to said first and second comb filter networks, a bandpass filter having a predetermined passband encompassing said carrier frequency, means for applying the signals passed by said second comb filter network to said bandpass filter, and means for combining the signals passed by said bandpass filter with the signals passed by said first comb filter network, a detector, and means for applying the output of said combining means to said detector.

7. Apparatus in accordance with claim 6 wherein said receiver is provided with an image reproducing device operating at a predetermined line scanning frequency, and wherein said first multiple bandpass characteristic comprises a series of successive pass and stop bands, the stop bands of said characteristic being centered about odd harmonics of half the line frequency of said receiver, said different multiple bandpass characteristic also comprising a series of successive pass and stop bands, the stop bands of said latter characteristic being centered about even harmonics of half the line frequency of said receiver, said video modulated carrier waves comprising carrier frequency waves modulated by a composite color picture signal which comprises a luminance signal component and a chrominance signal component, said chrominance signal component comprising a phase and amplitude modulated color subcarrier, the frequency of said color subcarrier being an odd multiple of half said line frequency, said receiver including a luminance signal channel and a chrominance signal channel, and means for applying the output of said detector to said luminance signal channel.

8. Apparatus in accordance with claim 7 including an additional detector, means for applying the signals passed by said second comb filter network to said additional detector, and means for applying the output of said additional detector to said chrominance signal channel.

9. In a video signalling system, a source of video modulated carrier frequency waves, an ultrasonic delay line having a predetermined low frequency cut-off and being provided with a plurality of spaced signal take-offs, means for applying said video modulated carrier frequency waves to said delay line, means for combining signals derived from said plurality of signal take-offs to obtain an output signal which conforms to a first multiple bandpass characteristic above the cut-off frequency of said delay line, means for differently combining signals from said plurality of signal take-offs to provide a second output signal conforming to a second multiple bandpass characteristic above the cut-off frequency of said delay line, said second multiple bandpass characteristic being substantially complementary to said first multiple bandpass characteristic, a bandpass filter coupled to said second-named signal combining means for restricting said second output signal to a predetermined passband encompassing said carrier frequency, means for adding the frequency restricted second output signal to the first-named output signal, and demodulating means coupled to said adding means for recovering video signals from said combined first and second output signals.

References Cited in the file of this patent

UNITED STATES PATENTS 2,636,937 Fredendall ------------ Apr. 28, 1937